(12) United States Patent
Svihla et al.

(10) Patent No.: US 9,488,061 B2
(45) Date of Patent: Nov. 8, 2016

(54) COMPRESSOR SEAL ASSEMBLY FOR A TURBOCHARGER

(71) Applicant: Electro-Motive Diesel, Inc., LaGrange, IL (US)

(72) Inventors: Gary R. Svihla, Burr Ridge, IL (US); Raji Rexavier, Plainfield, IL (US); Joshua D. Schueler, New Lenox, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 0 days.

(21) Appl. No.: 14/503,911

(22) Filed: Oct. 1, 2014

(65) Prior Publication Data
US 2016/0097293 A1 Apr. 7, 2016

(51) Int. Cl.
*F01D 11/02* (2006.01)
*F16J 15/40* (2006.01)
*F16J 15/447* (2006.01)

(52) U.S. Cl.
CPC ............... *F01D 11/02* (2013.01); *F16J 15/40* (2013.01); *F16J 15/447* (2013.01); *F05D 2220/40* (2013.01); *F05D 2240/55* (2013.01)

(58) Field of Classification Search
CPC ..... B61F 15/22; F16J 15/40; F05D 2220/40; F05D 2240/55; F01D 11/02
USPC .................................................. 277/423–429
See application file for complete search history.

(56) References Cited

U.S. PATENT DOCUMENTS 2,005,526 A * 6/1935 Albeck ................... B61F 15/22
277/356
2,142,632 A * 1/1939 Cox ........................ B61F 15/22
384/480
2,210,543 A * 8/1940 Cox ........................ B61F 15/22
277/412
2,254,862 A 9/1941 Watson et al.
(Continued)

FOREIGN PATENT DOCUMENTS

CN 203548697 U 4/2014
DE 607992 C * 1/1935 .............. B61F 15/22
(Continued)

OTHER PUBLICATIONS

U.S. Patent Application of Gary R. Svihla et al. entitled "Turbine Bearing and Seal Assembly for a Turbocharger" filed on Oct. 1, 2014.

*Primary Examiner* — Kristina Fulton
*Assistant Examiner* — Eugene G Byrd
(74) *Attorney, Agent, or Firm* — Finnegan, Henderson, Farabow, Garrett & Dunner, LLP

(57) ABSTRACT

A compressor seal assembly is disclosed. The compressor seal assembly may have a seal ring having a seal ring bore. The compressor seal assembly may also have a collar. The collar may have a cap portion having a first bore configured to receive an impeller. The cap portion may be disposed in the seal ring bore. The collar may further have a journal portion having a second bore configured to receive a shaft connectable to the impeller. The collar may also have a slinger disposed between the cap portion and the journal portion. The slinger may have a generally cylindrical shape and may have a front face. The slinger may also have a rear face opposite the front face. Further, the slinger may have a cylindrical side surface extending between the front face and the rear face. In addition, the slinger may have a groove disposed on the side surface.

20 Claims, 3 Drawing Sheets

(56) References Cited

U.S. PATENT DOCUMENTS

| | | | |
|---|---|---|---|
| 2,903,306 A * | 9/1959 | Barber | B61F 15/22 |
| | | | 277/356 |
| 3,096,126 A * | 7/1963 | Woollenweber, Jr. | F01D 25/166 |
| | | | 384/114 |
| 3,258,199 A * | 6/1966 | Anderson | F01D 11/003 |
| | | | 277/362 |
| 3,531,131 A | 9/1970 | Hummer | |
| 3,667,214 A * | 6/1972 | Addie | F01D 25/04 |
| | | | 464/24 |
| 3,988,081 A * | 10/1976 | Goloff | F01C 19/08 |
| | | | 277/357 |
| 4,575,100 A * | 3/1986 | Hay, II | F04C 15/0038 |
| | | | 277/347 |
| 4,840,384 A | 6/1989 | Dorsch | |
| 5,219,434 A * | 6/1993 | Von Bergen | F16J 15/3456 |
| | | | 210/171 |
| 6,513,812 B1 * | 2/2003 | Yang | F16J 15/3264 |
| | | | 277/351 |
| 6,758,598 B2 | 7/2004 | Beauvais et al. | |
| 7,793,499 B2 * | 9/2010 | Gutknecht | F01D 25/166 |
| | | | 184/6.11 |
| 7,832,938 B2 * | 11/2010 | McKeirnan, Jr. | F16C 35/077 |
| | | | 384/504 |
| 2009/0136368 A1 | 5/2009 | Arnold et al. | |
| 2010/0052265 A1 * | 3/2010 | Hartmann | F16J 15/3264 |
| | | | 277/424 |
| 2013/0071243 A1 | 3/2013 | Kocher et al. | |
| 2013/0089407 A1 | 4/2013 | Ranz | |
| 2013/0177406 A1 | 7/2013 | Heaton et al. | |
| 2014/0003912 A1 | 1/2014 | Knaack | |
| 2014/0086731 A1 | 3/2014 | Schmidt et al. | |

FOREIGN PATENT DOCUMENTS

| | | | | |
|---|---|---|---|---|
| EP | 2 615 261 A1 | | 7/2013 | |
| FR | 722203 A | * | 3/1932 | B61F 15/22 |
| FR | 1081916 A | * | 12/1954 | B61F 15/22 |
| GB | 792327 A | * | 3/1958 | B61F 15/22 |
| WO | WO 2013/022684 | | 2/2013 | |

* cited by examiner

COMPRESSOR SEAL ASSEMBLY FOR A TURBOCHARGER

TECHNICAL FIELD

The present disclosure relates generally to a compressor seal assembly and, more particularly, to a compressor seal assembly for a turbocharger.

BACKGROUND

Internal combustion engines, for example, diesel engines, gasoline engines, or natural gas engines employ turbochargers to deliver compressed air for combustion in the engine. A turbocharger compresses air flowing into the engine, helping to force more air into combustion chambers of the engine. The increased supply of air allows for increased fuel combustion in the combustion chambers of the engine, resulting in increased power output from the engine.

A typical turbocharger includes a housing, a shaft, a turbine wheel attached to one end of the shaft, a compressor wheel connected to the other end of the shaft, and bearings to support the shaft. Exhaust from the engine expands over the turbine wheel and rotates the turbine wheel. The turbine wheel in turn rotates the compressor wheel via the shaft. The compressor wheel receives cool air from the ambient and forces compressed air into combustion chambers of the engine.

An oil pump typically provides pressurized oil to lubricate the turbocharger bearings located within a bearing housing. The turbocharger shaft may also include features that may help to sling the oil away from the shaft through centrifugal forces generated during operation of the turbocharger. Slinging oil away from the shaft makes it harder for the oil to leak through gaps between the shaft and the bearing housing into the compressor volute. Seals between shaft and the bearing housing also help ensure that oil does not escape into the compressor volute. The seals also prevent excessive air leakage into the oil drain cavity of the turbocharger. Air leakage into the turbocharger can pressurize the attached engine crankcase and place additional demands on the crankcase ventilation system.

Although a simple seal geometry may minimize the manufacturing costs, a simplified geometry may also make the seal less effective. In particular, a simple seal geometry may not prevent oil from reaching the gap between the shaft and the surrounding housing when the turbocharger remains inoperative or when the turbocharger operates at reduced rotational speed, preventing the oil from being effectively flung away from the shaft. Thus, balancing manufacturing costs and sealing effectiveness becomes important when designing a seal for the compressor in a turbocharger.

One attempt to address some of the problems described above is disclosed in European Patent Application No. 2 615 261 A1 of Ramasamy et al. that published on Jul. 17, 2013 ("the '261 publication"). In particular, the '261 publication discloses a turbocharger shaft including a boss at the compressor end having a larger diameter compared to the shaft. The '261 publication further discloses that the boss is received in a bore of the compressor housing. The '261 publication also discloses that the outer surface of the boss has an annular groove, which receives a piston ring attached to the inner walls of the bore of the compressor housing. In addition, the '261 publication discloses that the boss includes an integrally formed oil slinger. The '261 publication also discloses that the area of the bearing housing that surrounds the oil slinger includes an annular chamber that captures the dispersed oil and allows oil to flow out of a drain.

Although the '261 publication discloses a compressor oil seal, the disclosed seal may still be less than optimal. In particular, the use of a piston ring, as disclosed in the '261 publication, requires a back stop to locate the piston ring and resist pressure loads generated by the gases behind the impeller. Further, due to the tight fit between the axial faces of the piston ring and the corresponding walls of the rotating annular groove, the back stop location must remain very tightly controlled axially and the turbocharger shaft must also attenuate axial free play to a small amount such that the groove doesn't excessively wear into the piston ring. The need for such tightly controlled dimensions increases the manufacturing cost. In addition, imbalance in the impeller or the shaft, during degraded states of operation, can overcome the radial clearance between the piston ring and groove, damaging both the piston ring and surrounding rotor and housing pieces. The oil slinger disclosed in the '261 publication may also be less than optimal for other reasons. In particular, a diameter of the oil slinger in the '261 publication appears to be only slightly larger than that of the shaft. Moreover, the oil dispersed by the slinger of the '261 publication is captured by the annular recess and drained to the sump. As a result the oil dispersed from the shaft may not be available to cool the bearing housing. The seal of the '261 publication may also be unable to prevent oil leakage when the turbocharger is not operational.

The compressor seal of the present disclosure solves one or more of the problems set forth above and/or other problems of the prior art.

SUMMARY

In one aspect, the present disclosure is directed to a compressor seal assembly. The compressor seal assembly may include a seal ring having a seal ring bore. The compressor seal assembly may also include a collar. The collar may include a cap portion having a first bore configured to receive an impeller. The cap portion may be disposed in the seal ring bore. The collar may further include a journal portion having a second bore configured to receive a shaft connectable to the impeller. The collar may also include a slinger disposed between the cap portion and the journal portion. The slinger may have a generally cylindrical shape and may include a front face. The slinger may also include a rear face opposite the front face. Further, the slinger may include a cylindrical side surface extending between the front face and the rear face. In addition, the slinger may include a groove disposed on the side surface.

In another aspect, the present disclosure is directed to a collar. The collar may include a cap portion having a first bore configured to receive an impeller. The collar may also include a journal portion having a second bore configured to receive a shaft connectable to the impeller. In addition, the collar may include a slinger disposed between the cap portion and the journal portion. The slinger may include a generally cylindrical shape and a front face. The slinger may also include a rear face opposite the front face. Further, the slinger may include a circumferential side surface extending between the front face and the rear face. In addition, the slinger may include a groove disposed on the side surface.

DETAILED DESCRIPTION

Figure 1:
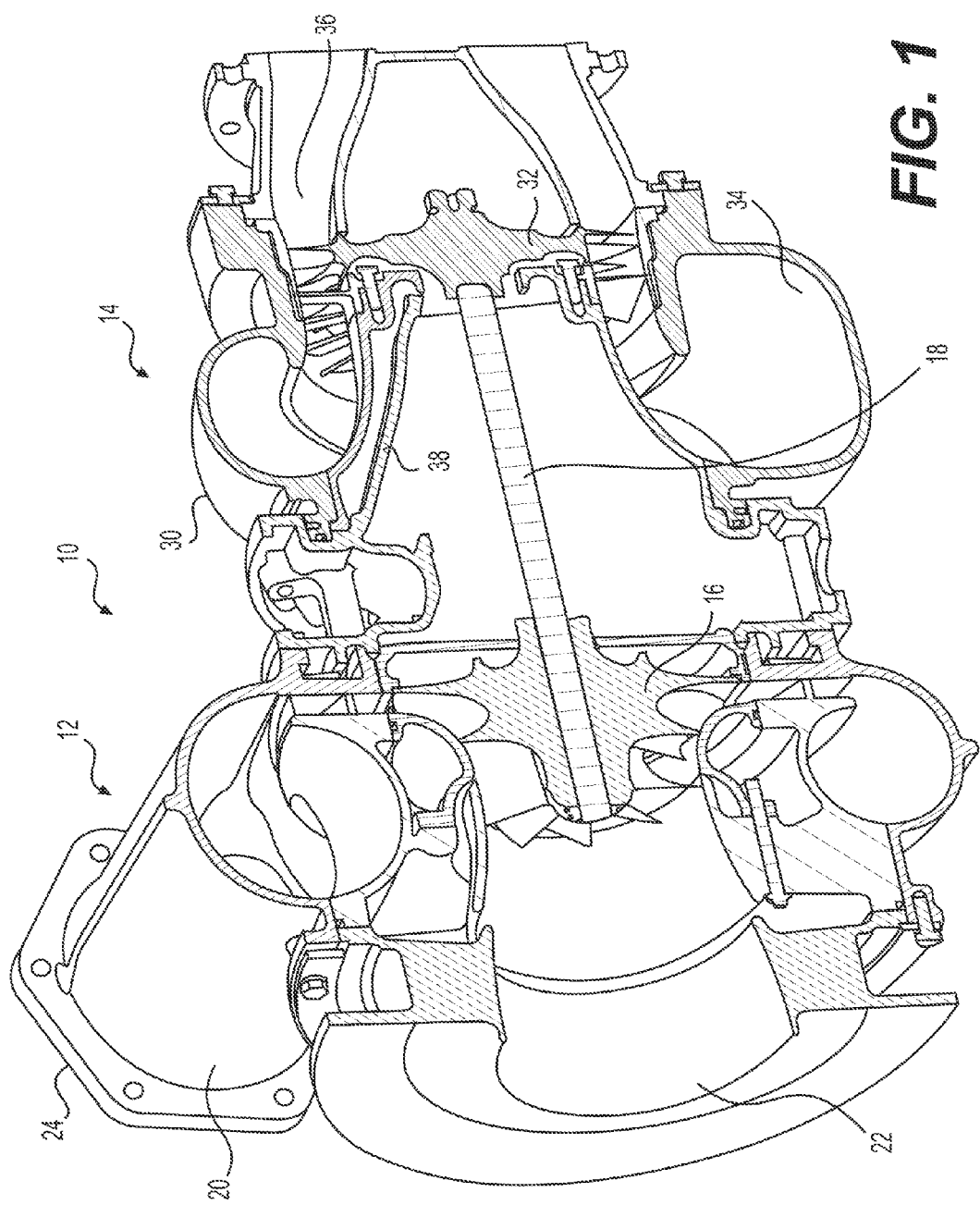
FIG. 1 is a cut-away view of an exemplary disclosed turbocharger.

FIG. 1 illustrates an exemplary embodiment of a turbocharger 10. Turbocharger 10 may be used with an engine (not shown) of a machine that performs some type of operation associated with an industry such as railroad, marine, power generation, mining, construction, farming, or another industry known in the art. As shown in FIG. 1, turbocharger 10 may include compressor stage 12 and turbine stage 14. Compressor stage 12 may embody a fixed geometry compressor impeller 16 attached to shaft 18 and configured to compress air received from an ambient to a predetermined pressure level before the air enters the engine for combustion. Air may enter compressor housing 20 via compressor inlet 22 and exit compressor housing 20 via compressor outlet 24. As air moves through compressor stage 12, compressor impeller 16 may force compressed air into the engine.

Turbine stage 14 may be a fixed geometry turbine. Turbine stage 14 may include turbine housing 30 and turbine wheel 32, which may be attached to shaft 18. Exhaust gases exiting the engine may enter turbine housing 30 via turbine inlet 34 and exit turbine housing 30 via turbine outlet 36. As the hot exhaust gases move through turbine housing 30 and expand against the blades of turbine wheel 32, turbine wheel 32 may rotate compressor impeller 16 via shaft 18. The hot exhaust gases may also heat turbine housing 30, which in turn may heat compressor housing 20, bearing housing 38, and other components of the turbocharger attached to or located near turbine housing 30.

Figure 2:
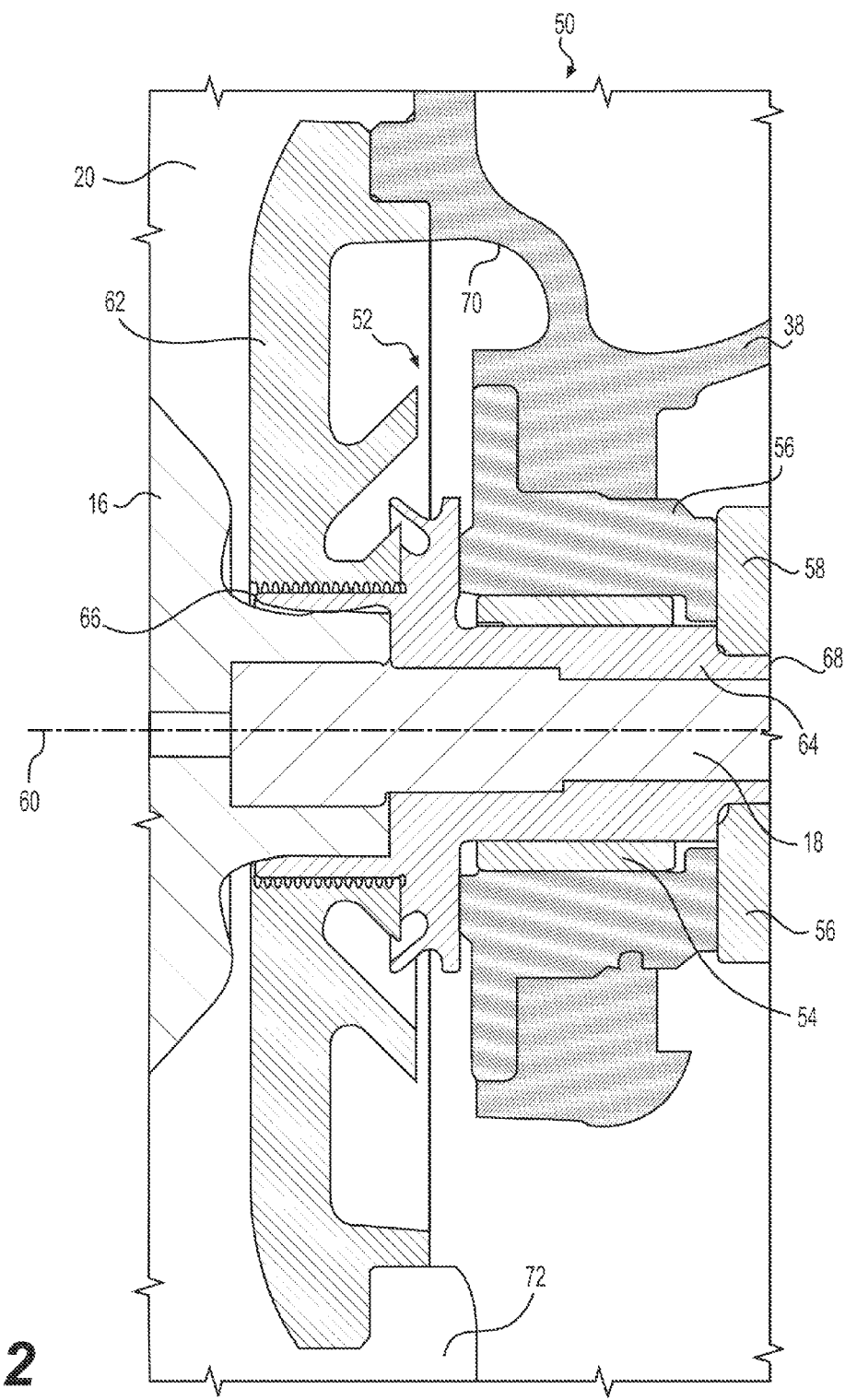
FIG. 2 is a cut-away view of an exemplary disclosed compressor assembly for the turbocharger of FIG. 1.

FIG. 2 illustrates a cut-away view of an exemplary embodiment of a compressor assembly 50 for turbocharger 10. Compressor assembly 50 may include compressor impeller 16, shaft 18, compressor seal assembly 52, journal bearing 54, thrust bearing 56, thrust washer 58, and bearing housing 38, all of which may be disposed around a rotational axis 60 of compressor assembly 50. As illustrated in FIG. 2, compressor seal assembly 52 may include seal ring 62 and collar 64. Compressor impeller 16 may be received adjacent first end 66 of collar 64. Seal ring 62 may be disposed around collar 64 adjacent first end 66 of collar 64. Shaft 18 may be attached to compressor impeller 16 adjacent first end 66 of collar 64. Shaft 18 may exit compressor assembly 50 adjacent second end 68 of collar 64. Thus, for example, shaft 18 may be attached to compressor impeller 16 at a location that may be nearer to first end 66 than to second end 68 of collar 64. Collar 64 may be supported by journal bearing 54 at a location nearer to second end 68, as compared to first end 66. Thrust bearing 56 may be disposed between collar 64 and thrust washer 58, which may be located adjacent to second end 68 of collar 64. Journal bearing 54 may help support radial loads on collar 64, whereas thrust bearing 56 may support axial loads on collar 64.

Collar 64 may be configured to fling oil towards inner wall 70 of bearing housing 38 because of centrifugal forces exerted on the oil during rotation of collar 64 around rotational axis 60. The dispersed oil may bounce off inner wall 70 and drip towards collar 64 during operation of turbocharger 10. Oil from inner wall 70 may also drip towards collar 64 during periods when turbocharger 10 may be inoperative. Oil may also drip from collar 64 to drain 72 from where oil may be returned to a sump (not shown).

Figure 3:
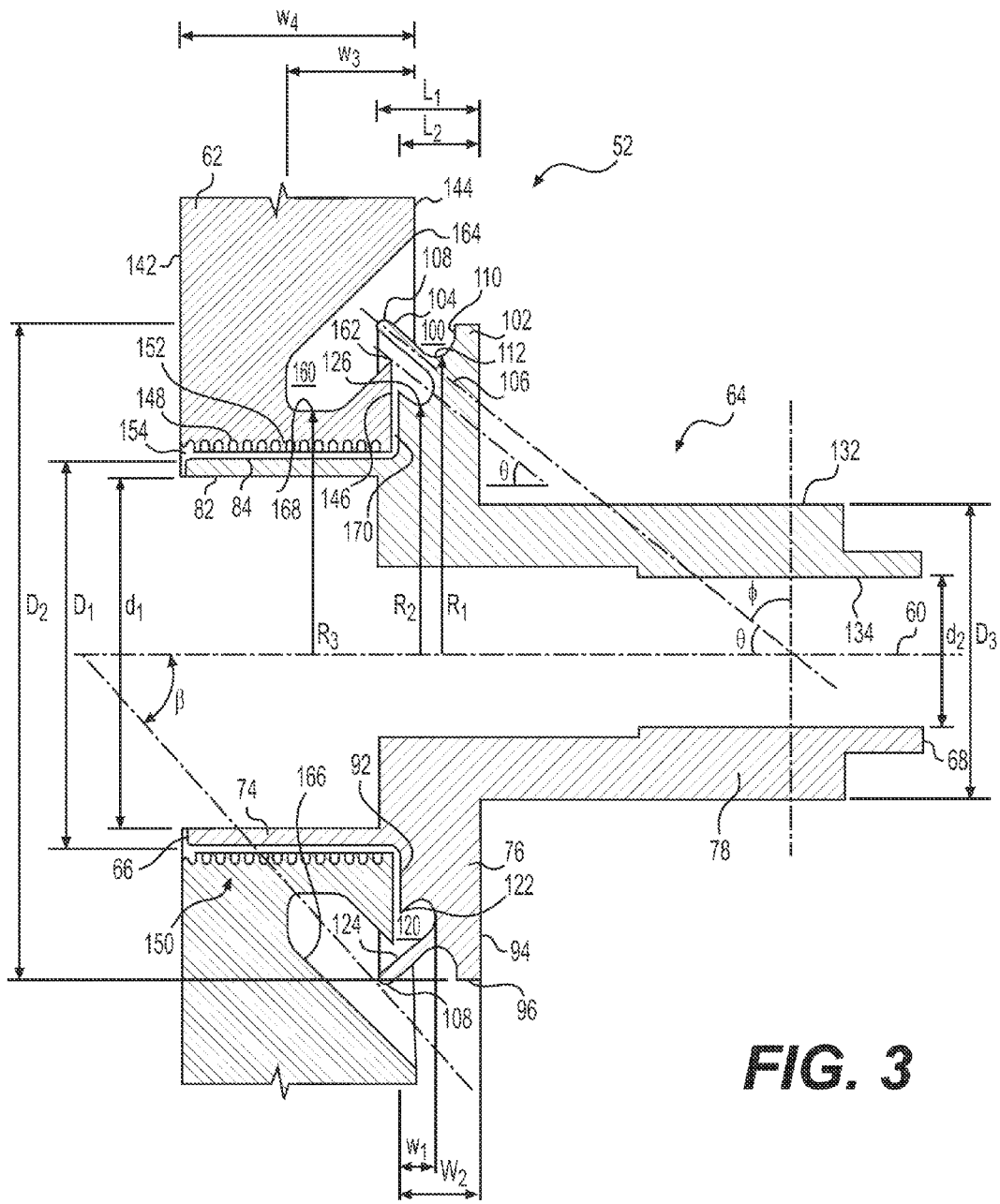
FIG. 3 is another cut-away view showing an exemplary disclosed compressor seal assembly for the compressor assembly of FIG. 2.

FIG. 3 illustrates another cut-away view showing details of compressor seal assembly 52. As illustrated in FIG. 3, collar 64 may have cap portion 74, slinger 76, and journal portion 78. Cap portion 74 may be disposed nearer first end 66 of collar 64 as compared to second end 68. Journal portion 78 may be disposed nearer second end 68 of collar 64, as compared to first end 66. Slinger 76 may be disposed between cap portion 74 and journal portion 78.

Cap portion 74 may have a first bore 82 and an outer surface 84. Cap portion 74 may have a cylindrical shape and first bore 82 may have a circular cross-section. Outer surface 84 of cap portion 74 may have an outer diameter "D1." First bore 82 of cap portion 74 may have an inner diameter "d1." Although FIG. 3 illustrates a cylindrically shaped cap portion 74 with a first bore 82 having a circular cross-section, it is contemplated that cap portion 74 may have an elliptical, polygonal, or any other shape known in the art. It is also contemplated that first bore 82 may have a cross-section, which may be elliptical, polygonal, or may have any other shape known in the art. First bore 82 may be configured to receive compressor impeller 16 (see FIG. 2).

Slinger 76 may have a front face 92, rear face 94, and a cylindrical side surface 96, which may extend between front face 92 and rear face 94. Front face 92 and rear face 94 may be generally orthogonal to rotational axis 60. Rear face 94 of slinger 76 may have an outer diameter "D2." Slinger 76 may also have first groove 100, which may be disposed around a circumference of slinger 76 on side surface 96. First groove 100 may have a lip 102 disposed adjacent rear face 94. Lip 102 may extend in a radial direction relative to rotational axis 60. First groove 100 may also have a shroud 104 disposed adjacent front face 92. Shroud 104 may be a projection extending from shroud root 106 to a distal end 108. First groove 100 may include first groove surface 110, which may extend from lip 102 to distal end 108.

As further illustrated in FIG. 3, shroud 104 may extend generally axially from shroud root 106 to distal end 108 in a direction from rear face 94 towards front face 92 of slinger 76. In one exemplary embodiment, shroud 104 may be disposed at an angle "θ" relative to rotational axis 60 and at a complimentary angle "φ" relative to a plane orthogonal to rotational axis 60 and parallel to front face 92 of slinger 76. As further illustrated in FIG. 3, bottom portion 112 of first groove surface 110 may be located at a radial distance R1 from rotational axis 60. In one exemplary embodiment radial distance R1 may be smaller than a radius (D2/2) of rear face 94. First groove 100 may have a generally concave shape, which may face radially outward, allowing first groove 100 to collect oil, which may drip from inner wall 70 of bearing housing 38 (see FIG. 2).

Slinger 76 may include a second groove 120 disposed on front face 92. Second groove 120 may be disposed in a circumferential manner on front face 92. As illustrated in FIG. 3, second groove 120 may extend from front face 92 towards rear face 94. Second groove 120 may extend to an axial distance "W1" which may be smaller than a thickness "W2" of slinger 76. In one exemplary embodiment as illustrated in FIG. 3, second groove 120 may be inclined at an angle θ relative to rotational axis 60. It is contemplated, however, that second groove 120 may be inclined with respect to rotational axis 60 at any angle which may be the same as or different from angle θ. Second groove 120 may have a lip 122, which may be coincident with front face 92. Second groove 120 may also include second groove surface 124 which may extend from lip 122 to distal end 108 of shroud 104. As further illustrated in FIG. 3, bottom portion 126 of second groove surface 124 may be located at a radial distance R2 from rotational axis 60. In one exemplary embodiment, radial distance R2 may be smaller a radius (D2/2) of rear face 94. Radial distance R2 may also be smaller than radial distance R1 of bottom portion 112 of first groove 100. Second groove 120 may have a generally concave shape facing towards first end 66 of collar 64, allowing second groove 120 to collect oil, which may drip from inner wall 70 of bearing housing 38 (see FIG. 2). When turbocharger 10 is not in operation, oil may wick around distal end 108 of shroud 104 and may be collected in second groove 120. Oil collected in second groove 120 may flow circumferentially around second groove 120 and may flow out of drain 72 in bearing housing 38 (see FIG. 2). Although FIG. 3 illustrates only one circumferential second groove 120, it is contemplated that front face 92 may include more than one circumferential second groove 120.

Journal portion 78 of collar 64 may have a cylindrical shape and an outer surface 132. Outer surface 132 may be received in journal bearing 54 (see FIG. 2). As illustrated in FIG. 3, journal portion 78 may have a second bore 134, which may be configured to receive shaft 18 (see FIG. 2). Outer surface 132 may have an outer diameter "D3." Second bore 134 may have a circular cross-section having an inner diameter "d2." It is contemplated that second bore 134 may have a cross-sectional shape that may be elliptical, polygonal, or any other shape known in the art. In one exemplary embodiment as shown in FIG. 3, outer diameter D1 of cap portion 74 may be larger than outer diameter D3 of journal portion 78 and outer diameter D2 of slinger 76 may be larger than the outer diameters D1 and D3 of cap portion 74 and journal portion 78, respectively. In another exemplary embodiment as illustrated in FIG. 3, inner diameter d1 of first bore 82 may be larger than inner diameter d2 of second bore 134.

As further illustrated in FIG. 3, compressor seal assembly 52 may include seal ring 62. Seal ring 62 may be circumferentially disposed around cap portion 74 of collar 64. Seal ring 62 may have a front seal face 142, a first rear seal face 144, a second rear seal face 146, and a cylindrical seal ring bore 148 extending from front seal face 142 to second rear seal face 146. Front seal face 142, first rear seal face 144, and second rear seal face 146 may be generally orthogonal to rotational axis 60. Seal ring bore 148 may be configured to receive outer surface 84 of cap portion 74.

Seal ring 62 may include a labyrinth seal 150 disposed between seal ring bore 148 and outer surface 84 of cap portion 74. Labyrinth seal 150 may include a plurality of projections 152, which may be axially separated from each other and may project radially inward from seal ring bore 148. A small annular gap 154 between projections 152 and outer surface 84 may allow collar 64 to rotate within seal ring bore 148. Leakage of oil, which may have entered annular gap 154 may be minimized by forcing the oil to wick around projections 152. A number and spacing of projections 152 may be selected based on the expected volume of oil in annular gap 154 and based on manufacturing considerations.

Seal ring 62 may include a third groove 160 disposed in a circumferential manner between first rear seal face 144 and second rear seal face 146. As illustrated in FIG. 3, third groove 160 may extend from first rear seal face 144 and second rear seal face 146 towards front seal face 142. Third groove 160 may extend to an axial distance "W3" which may be smaller than a thickness "W4" of seal ring 62. In one exemplary embodiment as illustrated in FIG. 3, third groove 160 may be inclined at an angle β relative to rotational axis 60. It is contemplated that β may be the same or different from angle. Third groove 160 may have a lower lip 162, which may be coincident with second rear seal face 146. Third groove 160 may also have an upper lip 164, which may be coincident with first rear seal face 144. Further, third groove 160 may include third groove surface 166 which may extend from lower lip 162 to upper lip 164. As further illustrated in FIG. 3, bottom portion 168 of third groove surface 166 may be located at a radial distance R3 from rotational axis 60. In one exemplary embodiment, radial distance R3 may be smaller than a radius (D2/2) of rear face 94 of slinger 76. Radial distance R3 may also be smaller than radial distance R2 of bottom portion 126 of second groove 120. Third groove 160 may have a generally concave shape facing towards second end 68 of collar 64.

As further illustrated in FIG. 3, second rear seal face 146 of seal ring 62 may be separated from front face 92 of slinger 76 by axial gap 170. Shroud 104 may extend axially into third groove 160 so as to overhang or cover axial gap 170. Thus, for example, an axial distance "L1" of distal end 108 of shroud 104 from rear face 94 of slinger 76 may be larger than an axial distance "L2" of second rear seal face 146 of seal ring 62 from rear face 94 of slinger 76. By allowing shroud 104 to overhang axial gap 170, oil which may drip from inner wall 70 (see FIG. 2) of bearing housing 38 may be collected in first groove 100 or third groove 160, minimizing an amount of oil that may reach axial gap 170. Oil which may drip from distal end 108 of shroud 104 may also be collected in second groove 120 and/or third groove 160 further minimizing the amount of oil that may reach axial gap 170.

Oil collected in third groove 160 may flow circumferentially around third groove 160 and may flow out of drain 72 in bearing housing 38. Although FIG. 3 illustrates only one circumferential third groove 160, it is contemplated that seal ring 62 may include more than one circumferential third groove 160. As illustrated in FIGS. 2 and 3, the angles of inclination and relative radial positions of first, second, and third grooves 100, 120, and 160 and the overhang of shroud 104 over axial gap 170 may minimize an amount of oil, which may escape via axial gap 170 into annular gap 154 of labyrinth seal 150. By preventing oil from reaching labyrinth seal 150, compressor seal assembly 52 may help minimize leakage of oil from annular gap 154 into compressor housing 20 (see FIG. 2). In one exemplary embodiment, first, second, and third grooves 100, 120, 160 may cooperate to prevent any amount of oil from reaching annular gap 154.

INDUSTRIAL APPLICABILITY

The disclosed compressor seal assembly 52 may be implemented to minimize an amount of oil leakage from a bearing housing of a compressor in a turbocharger associated with an internal combustion engine. The disclosed compressor seal assembly 52 may help reduce an amount of leakage by trapping the oil in grooves in compressor seal assembly 52. The disclosed compressor seal assembly 52 may also allow oil to be dispersed from shaft 18 to inner wall 70 of bearing housing 38 to provide improved cooling of inner wall 70 of bearing housing 38 and seal ring 62, which in turn may help to reduce heating of compressor impeller 16 from heat radiating from turbine housing 30.

Referring to FIGS. 1, 2, and 3, during engine operation, compressor impeller 16 and collar 64 may rotate with shaft 18. Rotation of collar 64 and slinger 76 may help to disperse oil from shaft 18 towards inner wall 70 of bearing housing 38 because of centrifugal forces induced on the oil. The dispersed oil may bounce off inner wall 70 and may fall towards shaft 18. As the oil drips towards shaft 18, the oil may be collected in first groove 100 on side surface 96 of slinger 76. The inclined shroud 104 may help to collect oil dripping from inner wall 70 towards shaft 18 in first groove 100. Because shroud 104 overhangs axial gap 170 between second rear seal face 146 of seal ring 62 and front face 92 of slinger 76, shroud 104 may help minimize an amount of oil from reaching axial gap 170. During operation of turbocharger 10, oil may also drip along first rear seal face 144 of seal ring 62 and may be collected by third groove 160. By trapping oil in third groove 160, compressor seal assembly 52 may further minimize the amount of oil that may enter axial gap 170. By minimizing the amount of oil from entering axial gap 170, first groove 100, shroud 104, and third groove 160 may minimize an amount of oil available for leakage via annular gap 154. Oil collected in first and third grooves 100, 160 may travel circumferentially along first and third grooves 100, 160 and flow out of drain 72 to the sump (not shown).

When turbocharger 10 is not operating, shaft 18 and collar 64 may be stationary. In this situation, oil may not be dispersed from shaft 18 towards inner wall 70 of bearing housing 38. Oil which may have been dispersed during operation of turbocharger 10 may, however, drip from inner wall 70 towards shaft 18. A majority of the dripping oil may be captured by first and third grooves 100 and 160 as described above. Some of the oil, however, may wick around distal end 108 of shroud 104 and may be collected by second groove 120. By collecting oil in second groove 120 when turbocharger 10 is in inoperative, second groove 120 may also minimize the amount of oil that may enter axial gap 170. As discussed above, minimizing the amount of oil that enters axial gap 170 may help to minimize the amount of oil that may pass through labyrinth seal 150 and annular gap 154 and enter compressor housing 20. Thus, first, second, and third grooves 100, 120, 160 and shroud 104 may cooperate to help minimize an amount of oil which can leak from bearing housing 38 into compressor housing 20 via axial gap 170 and annular gap 154 during operation of turbocharger 10 and when turbocharger 10 is not operational.

It will be apparent to those skilled in the art that various modifications and variations can be made to the disclosed compressor seal assembly. Other embodiments will be apparent to those skilled in the art from consideration of the specification and practice of the disclosed compressor seal assembly. It is intended that the specification and examples be considered as exemplary only, with a true scope being indicated by the following claims and their equivalents.

What is claimed is:

1. A compressor seal assembly, comprising:
  a seal ring having a seal ring bore; the seal ring including a front seal face; a rear seal face opposite the front seal face, and a seal ring groove disposed circumferentially on the rear seal face, the seal ring groove extending from the rear seal face towards the front seal face; and
  a collar, including:
    a cap portion having a first bore configured to receive an impeller, the cap portion being disposed in the seal ring bore;
    a journal portion having a second bore configured to receive a shaft connectable to the impeller; and
    a slinger disposed between the cap portion and the journal portion, the slinger having a generally cylindrical shape and including:
      a front face disposed adjacent the rear seal face of the seal ring, the front face being separated from the rear seal face by an axial gap;
      a rear face opposite the front face;
      a cylindrical side surface extending between the front face and the rear face; and
      a first slinger groove disposed on the side surface, and including a lip adjacent the rear face, the lip extending in a radial direction; a shroud extending from a shroud root on the slinger to a distal end at a first angle relative to the front face; and a groove surface disposed between the lip and the distal end, the shroud extending into the seal ring groove and covering the axial gap.

2. The compressor seal assembly of claim 1, wherein the collar further includes a second slinger groove disposed circumferentially on the front face, the second slinger groove extending from the front face towards the rear face.

3. The compressor seal assembly of claim 2, wherein the second slinger groove extends into the slinger at a second angle relative to the front face.

4. The compressor seal assembly of claim 3 wherein the shroud is disposed between the first slinger groove and the second slinger groove.

5. The compressor seal assembly of claim 1, wherein the seal ring groove extends into the seal ring at an angle relative to the rear seal face.

6. The compressor seal assembly of claim 1, wherein the seal ring bore has a plurality of projections, the projections being axially spaced from each other and extending radially inwards from a surface of the seal ring bore.

7. The compressor seal assembly of claim 6, wherein an outer surface of the cap portion is separated from the projections by an annular gap.

8. A collar, comprising:
  a cap portion having a first bore configured to receive an impeller;
  a journal portion having a second bore configured to receive a shaft connectable to the impeller; and
  a slinger disposed between the cap portion and the journal portion, the slinger having a generally cylindrical shape and including:
    a front face;
    a rear face opposite the front face;
    a circumferential side surface extending between the front face and the rear face; and
    a first slinger groove disposed on the side surface, and including a first lip adjacent the rear face, the first lip extending in a radial direction; a shroud extending generally axially from a shroud root on the slinger to a distal end adjacent the front face; and a first groove surface disposed between the first lip and the distal end; and
    a second slinger groove disposed circumferentially on the front face, the second groove extending from the front face towards the rear face, and including a second lip disposed on the rear face, the second lip extending in a radial direction; the shroud; and a second groove surface disposed between the second lip and the distal end, and wherein the shroud protrudes axially from the front face a greater distance than the second lip.

9. The collar of claim 8, wherein the shroud extends at an angle relative to a rotational axis of the collar.

10. The collar of claim 8, wherein the first slinger groove surface has a concave shape facing radially outwards relative to a rotational axis of the collar.

11. The collar of claim 8, wherein the second slinger groove extends into the slinger at an angle relative to the front face.

12. The collar of claim 8, wherein the first bore has a first diameter larger than a second diameter of the second bore.

13. The collar of claim 8, wherein
the cap portion is generally cylindrical and has a first outer diameter, and
the journal portion is generally cylindrical and has a second outer diameter smaller than the first outer diameter.

14. The collar of claim 13, wherein the slinger has a third outer diameter larger than the first outer diameter.

15. The compressor seal assembly of claim 1, wherein the first bore has a first diameter larger than a second diameter of the second bore.

16. The compressor seal assembly of claim 2, wherein the second slinger groove includes a second lip disposed on the rear face, the second lip extending in a radial direction; the shroud; and a second groove surface disposed between the second lip and the distal end, and wherein the shroud protrudes axially from the front face a greater distance than the second lip.

17. The compressor seal assembly of claim 3, wherein the first angle is equal to the second angle.

18. A turbocharger, comprising:
a shaft including a impeller attachment end;
a compressor impeller with a shaft attachment end, the shaft attachment end including a shaft bore, the impeller attachment end fixedly disposed within the shaft bore; and
a compressor seal assembly, including a seal ring having a seal ring bore; and a collar including a cap portion, a journal portion, and a slinger; and
wherein:
the cap portion is disposed in the seal ring bore and includes a first bore, and the impeller attachment end is disposed in the first bore;
the journal portion includes a second bore and the a portion of the shaft is disposed in the second bore; and
the slinger is disposed between the cap portion and the journal portion, has a generally cylindrical shape and includes a front face, a rear face opposite the front face, a cylindrical side surface extending between the front face and the rear face, and a first slinger groove disposed on the side surface.

19. The turbocharger of claim 18, wherein:
the seal ring includes a front seal face; a rear seal face opposite the front seal face, and a seal ring groove disposed circumferentially on the rear seal face, the seal ring groove extending from the rear seal face towards the front seal face;
the front face is disposed adjacent the rear seal face of the seal ring, the front face being separated from the rear seal face by an axial gap; and
the first slinger groove includes a lip adjacent the rear face, the lip extending in a radial direction; a shroud extending from a shroud root on the slinger to a distal end at a first angle relative to the front face; and a groove surface disposed between the lip and the distal end, the shroud extending into the seal ring groove and covering the axial gap.

20. The turbocharger of claim 18, wherein:
the first slinger groove includes a first lip adjacent the rear face, the first lip extending in a radial direction; a shroud extending generally axially from a shroud root on the slinger to a distal end adjacent the front face; and a first groove surface disposed between the first lip and the distal end; and
the slinger includes a second slinger groove disposed circumferentially on the front face, the second groove extending from the front face towards the rear face, and including a second lip disposed on the rear face, the second lip extending in a radial direction; the shroud; and a second groove surface disposed between the second lip and the distal end, and wherein the shroud protrudes axially from the front face a greater distance than the second lip.

* * * * *